United States Patent [19]

Kahng et al.

[11] Patent Number: 5,198,721
[45] Date of Patent: Mar. 30, 1993

[54] ELECTROLUMINESCENT CELL USING A ZNS HOST INCLUDING MOLECULES OF A TERNARY EUROPIUM TETRAFLUORIDE COMPOUND

[75] Inventors: Dawon Kahng, Princeton, N.J.; Toshihiro Yoshioka, Kanagawa, Japan

[73] Assignee: NEC Research Institute, Inc., Princeton, N.J.

[21] Appl. No.: 690,587

[22] Filed: Feb. 24, 1991

[51] Int. Cl.$^5$ ............................................. H05B 33/14
[52] U.S. Cl. ..................... 313/503; 313/506; 252/301.6 S
[58] Field of Search ................. 252/301.6 S; 313/503, 313/506

[56] References Cited

U.S. PATENT DOCUMENTS 5,047,686  9/1991  Robertson ........................... 313/506
5,053,679 10/1991  Thioulouse ......................... 313/506
5,099,172  3/1992  Taguchi et al. ..................... 313/506

FOREIGN PATENT DOCUMENTS 53-76186 7/1978 Japan .............................. 252/301.6 S
59-146191 8/1984 Japan .............................. 252/301.6 S

OTHER PUBLICATIONS

Miura et al. "Proceeding of 1988 Fall Meeting of Japan Applied Physical Society", Paper No. 6p-D-6.

Primary Examiner—Jack Cooper
Attorney, Agent, or Firm—Arthur J. Torsiglieri

[57] ABSTRACT

A flat panel display utilizes an array of eletroluminescent cells in which the active layer is of polycrystalline zinc sulfide that is the host for molecules of a ternary europium fluoride compound, advantageously lithium europium tetrafluoride. Each cell includes a pair of electrodes between which are a silicon dioxide barrier layer, sufficiently thin for electrons to tunnel therethrough, the active layer, and a capacitive dielectric layer. Other ternary europium tetrafluoride compounds are discribed for use as the active layer.

1 Claim, 1 Drawing Sheet

ELECTROLUMINESCENT CELL USING A ZNS HOST INCLUDING MOLECULES OF A TERNARY EUROPIUM TETRAFLUORIDE COMPOUND

FIELD OF INVENTION

This invention relates to luminescence sources and more particularly to sources of red or blue light and to methods for the preparation of such sources.

There has been increasing interest in electroluminescence because of its promise for providing light cells useful in flat panel displays.

It is known that electrons allowed to drift in a high-field region in a host lattice that includes optically active ions or centers can obtain sufficiently high kinetic energies to excite the optically active ions or centers. This mechanism has been described as impact excitation and been used to explain luminescence in rare-earth and transition metal fluoride molecules in II-VI compounds, such as zinc sulphide. For impact excitation to be the dominant mechanism in such cases, it is important that the exciting electrons not be allowed to gain kinetic energies sufficient for impact ionization of either the optically active centers or the host lattice. This can be best accomplished when the total cross section for impact ionization is less than the cross section for impact excitation. Various optically active centers meet this requirement. Of particular interest is europium.

Europium ions are known to be especially attractive as a source of electroluminescence, the europium ion radiating in the red when in a trivalent state and in the blue when in the divalent state, when placed in suitable local field configurations.

The use of optically active molecular centers is known to have important advantages. First, ions of appropriate valencies for optical activity can usually be introduced in large concentration for large outputs, not necessarily limited by chemical compatibility with the host lattice. Often the chemical and metallurgical compatibility aspect has been a major difficulty to introducing rare-earth ions in II-VI compounds as optically active centers. Moreover, the relatively large size of molecular centers desirably provides a relatively large cross section for inelastic scattering of the hot electrons. Additionally, the nonradiative decay of the excited states is minimized since the included molecules typically have a poor phonon impedance match with the host lattice. Most molecules useful as optically active centers have been fluorides since the fluorine compounds involve strong bonds to the optically active centers. Moreover, fluorine compounds usually sublime and retain their molecular form when heated, and this makes these compounds well adapted for use where molecules of the compound are to be introduced into the host lattice by codeposition in a evaporation process.

Generally in the past, europium has been used as an element of a binary fluorine compound. However unfortunately such compounds when heated tend to dissociate resulting in poor valency control, so that when one seeks to introduce molecules of such europium compounds as optically active centers into a host lattice by codeposition evaporation, the resultant is a host lattice in which the europium has sizable concentrations of both divalent and trivalent states. As a consequence the emitted light is a weak mix of blue and red light, and not an efficient source of a single color, as is often desirable, due to non-radiative interactions between the ions of the two valency states.

An object of this invention is to use more effectively molecules including europium as optically active centers as sources of luminescence of a single color. Such sources are needed if they are to be used in a multicolor display.

SUMMARY OF THE INVENTION

We have discovered that a large concentration of optically active europium ions, predominantly of one of the two possible valencies such ions may take, can be incorporated into a suitable host lattice, such as zinc sulphide, by a process that includes introducing the europium in the form of a ternary compound that includes europium, fluorine and a third element. This third element is appropriately chosen to lock the valency of the europium ion to a desired one of its two possible states, divalent if the luminescence is to be primarily blue, trivalent if the luminescence is to be primarily red. In particular, we have found that lithium europium tetrafluoride ($LiEuF_4$) molecules are especially useful to provide a large concentration of optically active europium ions having a trivalent state in a zinc sulphide host lattice. This ternary compound and zinc sulphide can readily be codeposited by evaporation to form a large area layer of polycrystalline zinc sulphide that includes a uniform dispersion of lithium europium tetrafluoride, preferably between about 0.1 and 2 mole percent to serve as optically active centers of electroluminescence in the red. Smaller concentrations yield less light. Higher concentrations may strain the lattice structure and/or induce concentration quenching. Sodium europium tetrafluoride may similarly be expected to introduce red centers into zinc sulfide.

Alternatively, beryllium europium tetrafluoride ($BeEuF_4$) molecules may be used to introduce optically active europium centers into a host lattice in which the europium has a divalent state whereby the electroluminescence is in the blue. Additionally, the use of magnesium europium tetrafluoride ($MgEuF_4$) also may be expected to introduce europium centers of a divalent state for blue luminescence.

Generally, it can be expected that with ternary tetrafluoride compounds including europium as one element, the choice for a third element of one having a divalent state can be expected to lock the europium at a divalent state while the choice for a third element of one having a univalent state can be expected to lock the europium at a trivalent state. Additionally, it is likely that there may be used other ternary europium fluoride compounds involving still other third elements, including fluoride compounds having more than four fluorine atoms per molecule. In the preferred embodiment, a layer of silicon dixoide thin enough for electron to tunnel through conveniently is included between a transparent first electrode and the lithium europium tetrafluoride-rich zinc sulphide active layer, and a layer of a high dielectric medium suitable as a storage medium is included between a second electrode and the active layer. The addition of the silicon oxide layer particularly serves to enhance the efficiency of the electroluminescence process.

In another aspect, the invention is a process for forming an electroluminescent cell of the kind described. A feature of this process is the step of codepositing by evaporation on a common substrate molecules of zinc sulfide from a source of lithium europium fluoride, under conditions such that essentially all of the lithium europium tetrfluoride evaporated will sublime and condense in a zinc sulfide crystalline host lattice in molecular form.

The invention will be better understood from the following more detailed description taken in conjunction with the accompanying drawing.

DETAILED DESCRIPTION

Figure 1:
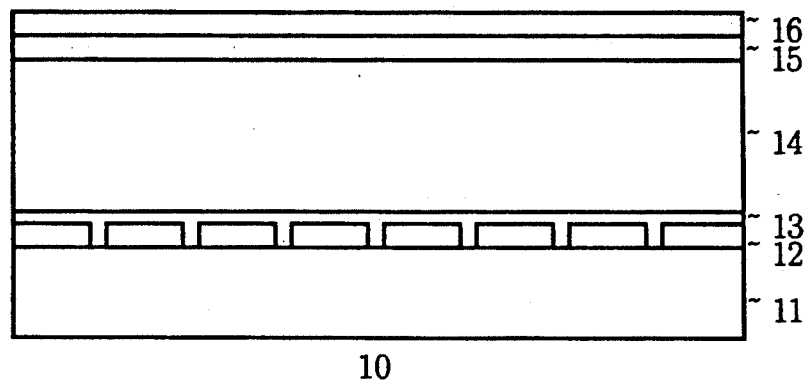
FIG. 1 shows a cross section of a portion of a flat panel electroluminescent monochromatic display that uses as the active layer a layer of polycrystalline zinc sulphide including a europium tetrafluoride ternary compound in accordance with the invention.

With reference now to the drawing, FIG. 1 shows in cross section a portion of a flat panel display 10 that utilizes an array of electroluminescent cells as the light sources. For purposes of illustration, the display is shown without any of the electronic circuitry, such as thin film transistors, that would be normally associated with the electroluminescent cells to energize the cells selectively in a pattern that serves as the information being displayed. Additionally, the display illustrated is a monochromatic display designed to use an array of cells of a single color, as might be used in a alpha-numeric display. It is expected that in the future flat panel displays, particularly large area displays, typically will incorporate three different arrays of cells, capable of providing the three colors needed to display normal color television scenes.

As shown, the display 10 includes a support member 11, typically a transparent glass plate, that provides mechanical support for the various components of the display. The components comprise a layer 12 of a transparent conductive material, such as indium-tin oxide (ITO), appropriately patterned to serve as the first set of electrodes for the array of electroluminescent cells that will form the display. In the usual fashion, the array of cells is defined by first and second sets of orthogonally positioned elongated electrodes spaced apart by the active layer. Individual cells of the array are formed in the active layer at the crosspoints of the two sets whereby individual cells can be selectively excited by establishing the requisite voltage for excitation across the crosspoint. As is known, electroluminescent cells are more efficiently excited by a-c voltages than d-c voltages so generally a-c voltages are used.

It has been found desirable to introduce a thin layer 13 of dielectric, advantageously silicon dioxide, over the ITO layer to serve as a barrier between the ITO layer 12 and the active zinc sulphide (ZnS) layer 14 that is to be deposited over the glass plate. A silicon dioxide barrier layer 13 serves to provide a chemically stable interface between the ITO and the ZnS. Additionally, a dielectric layer serves to enhance the efficiency of the electroluminescence process. A thickness of about 50 angstroms is sufficient for the barrier layer 13 to serve this role, since at this thickness electrons can tunnel through readily when the applied voltages are sufficient for cell excitation. The zinc sulfide layer 14 advantageously is about 0.5 micron thick and illustratively includes a uniform dispersion of about 0.5 mole percent of optically active molecules. If the display is to be a source of red light, the optically active molecules preferably would be of lithium europium tetrafluoride. There will be described in more detail below a process for forming a polycrystalline layer of zinc sulphide incorporating a uniform dispersion of lithium europium tetrafluoride molecules.

Next, the display 10 includes a layer 15 that will serve as the dielectric layer of the capacitor to be formed between the zinc sulfide layer 14 and the other or opposite set of elongated electrodes formed by conductive layer 16. Dielectric layer 15 desirably is of a high dielectric material, such as hafnium oxide, to more effectively serve as a charge storage medium. Layer 15 typically may be about 0.5 microns thick in which case the operating voltage for the display should be about fifty volts to provide the approximately forty volts drop across the zinc sulfide necessary to achieve the desired threshold field of about $0.8 \times 10^6$ volts/centimeter in the zinc sulfide layer field emission injection of electrons from the layer 12 and for impact excitation. Layer 16 is of any suitable conductor, and is patterned in the usual manner to serve as the second set of electrodes 12 that cooperate with the ITO electrodes of the first set to define the crosspoints where electroluminescence is to be established for providing the display. The conductive layer 16 advantageously should be absorptive of light incident on it to provide increased contrast with the light-emitting cells of the display unless it needs to be transparent, as it may in a multicolor display. In this case it may be of ITO to be transparent. Alternatively, this back surface could be coated to be absorptive when transparency is not desired. In the usual fashion, the first and second set of electrodes may be viewed as defining the X and Y coordinates of the selected portion of the zinc sulfide layer that is to be excited to luminesce.

Alternatively if the display is to provide blue light, the $LiEuF_4$-ZnS layer would be replaced by a $BeEuF_4$-ZnS layer which would serve as a source of divalent europium ions.

Figure 2:
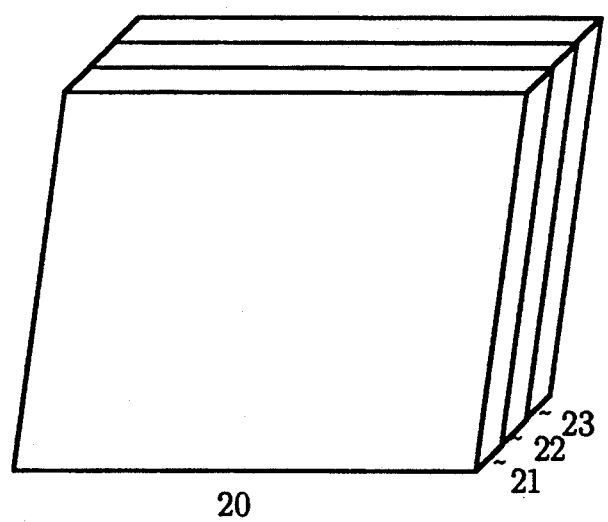
FIG. 2 shows a multicolor display utilizing three active layers of which two are of the kind used in the display of FIG. 1.

Moreover as is known, in a multicolor display there needs to be arrays of point sources of three separate colors, generally red, blue and green, properly aligned. Arrays of sources of red and blue light can be provided in the manner described. As is known, an array of sources of green light can be provided by use of a polycrystalline zinc sulphide host lattice in which terbium trifluoride molecules have been incorporated. FIG. 2 illustrates the superposition of three such arrays of which array 21 is a source of red light, array 22 a source of blue light, and array 23 a source of green light. Other arrangements should be feasible, so long as all three colors are available at the output.

As has been mentioned above, an important advantage that results from the choice of a ternary compound, such as $LiEuF_4$, as the active optical center is that its molecules can be readily dispersed in crystalline ZnS in a relatively high concentration because it sublimes when deposited by evaporation. This makes feasible codeposition by evaporation of ZnS and $LiEuF_4$ on the patterned glass support member 11.

This codeposition can readily be done in a appropriately designed evaporator of the kind known in the art. Such an evaporator typically includes a suitable chamber with provision for evacuation to a desirably low initial vacuum, and a structure for supporting a substrate on whose surface a layer or coating is to be deposited by codeposition evaporation. In the instant case, the substrate is a glass plate supported to expose one large area surface of which there was previously deposited a patterned ITO layer and the barrier layer. Additionally, the evaporator should include a pair of evaporation sources, one for depositing ZnS and the other for depositing LiEuF$_4$. The LiEuF$_4$ may advantageously be in the form of sintered block or powder whose particle size mostly is no larger than 2 mm diameter, supported in a ceramic-coated molybdenum boat. Apparatus is also generally included for heating each of these sources independently so that each can be heated to the temperature appropriate for its desired rate of evaporation. Typically, the ZnS is heated to about 900° C. for evaporation while the LiEuF$_4$ is heated to about 1000° C. The evaporation is controlled so that each source supplies a steady rate of molecules to the substrate. Advantageously the substrate is rotated or otherwise moved to deposit a coating or layer over the substrate of relatively uniform thickness and having a composition that consists of ZnS with a concentration of between 0.1 and 2 mole percent of LiEuF$_4$ molecules uniformly dispersed within the ZnS. The molecules are relatively energetic as they impact the substrate, effectively heating the substrate and increasing the ability of the molecules to shift and provide a substantially polycrystalline structure to the ZnS layer as it grows. If it is found necessary, additional heating of the substrate to about 400° C. may be appropriate to encourage crystalline growth of the LiEuF$_4$-rich ZnS layer. As previously discussed, when the deposition conditions are favorable, essentially all of the LiEuF$_4$ will sublime and condense in the ZnS layer and the Eu ions will retain their trivalent state so that the layer can be made to luminesce in the red when incorporated in a suitable device structure.

Conversely if the ZnS layer were to be used as a source of blue light, beryllium europium tetrafluoride would be used in the deposition process in an analogous fashion, so that the europium would be largely in a divalent state.

It should be understood that the specific embodiments described are illustrative of the general principles of the invention and that various other embodiments may be devised by a worker in the art without departing from the spirit and scope of the invention. In particular, the various layer thicknesses and the electrode and dielectric materials mentioned are merely illustrative.

What is claimed is:

1. An electroluminescent display including three arrays of cells superposed on one another, one array being of red light cells provided by a layer of polycrystalline zinc sulfide hosting molecules of lithium europium tetrafluoride as optically active centers, another array being of blue light cells provided by a layer of polycrystalline zinc sulfide hosting molecules of beryllium europium tetrafluoride as optically active centers, and another array being of green light cells provided by a layer of polycrystalline zinc sulfide hosting molecules of terbium trifluoride as optically active centers.

* * * * *